(12) United States Patent
Chen et al.

(10) Patent No.: US 12,023,794 B2
(45) Date of Patent: Jul. 2, 2024

(54) HANDHELD TOOL

(71) Applicant: ZHEJIANG LITHELI TECHNOLOGY CO., LTD, Ningbo (CN)

(72) Inventors: Gang Chen, Ningbo (CN); Ruilei Wu, Ningbo (CN); Rentian Yu, Ningbo (CN); Zhaozhi Wang, Ningbo (CN); Ruozhou Long, Ningbo (CN)

(73) Assignee: ZHEJIANG LITHELI TECHNOLOGY CO., LTD, Ningbo (CN)

( * ) Notice: Subject to any disclaimer, the term of this patent is extended or adjusted under 35 U.S.C. 154(b) by 5 days.

(21) Appl. No.: 18/017,087

(22) PCT Filed: Mar. 18, 2021

(86) PCT No.: PCT/CN2021/081472
§ 371 (c)(1),
(2) Date: Jan. 20, 2023

(87) PCT Pub. No.: WO2022/021900
PCT Pub. Date: Feb. 3, 2022

(65) Prior Publication Data
US 2023/0339091 A1    Oct. 26, 2023

(30) Foreign Application Priority Data

Jul. 27, 2020  (CN) .......................... 202021504658.3
Jan. 26, 2021  (CN) .......................... 202110101340.3

(51) Int. Cl.
*B25F 5/00*    (2006.01)
*B25F 5/02*    (2006.01)
(Continued)

(52) U.S. Cl.
CPC ............. *B25F 5/02* (2013.01); *H01M 50/247* (2021.01); *H01M 50/264* (2021.01)

(58) Field of Classification Search
CPC ....................................................... B25F 5/02
See application file for complete search history.

(56) References Cited

U.S. PATENT DOCUMENTS 5,799,739 A * 9/1998 Takaada .............. H01M 50/247
173/217
7,619,387 B2 * 11/2009 Amend ............... H01M 50/244
439/352
(Continued)

FOREIGN PATENT DOCUMENTS

CN        202684948 U  *  1/2013
CN        202684948 U      1/2013
(Continued)

*Primary Examiner* — Eyamindae C Jallow
(74) *Attorney, Agent, or Firm* — Bayramoglu Law Offices LLC

(57) ABSTRACT

Disclosed is a handheld tool using a battery pack (1). A positioning hole (118) is provided on the surface of the battery pack, a locking mechanism (31) matching the positioning hole is provided inside the handheld tool for locking or unlocking the battery pack, and an ejection mechanism (32) is further provided inside the handheld tool to work in conjunction with the locking mechanism to eject the battery pack when the battery pack is unlocked. The battery pack of the handheld tool can be completely inserted into a holding portion of the handheld tool, such that the tool can be made smaller. Moreover, the battery pack has a smooth surface and is convenient to carry, such that assembly/disassembly of the battery pack into/from the tool is more convenient. In addition, there is no detached gap between a tool housing and the battery pack on the surface of the tool, such that the appearance of the tool is more aesthetic.

13 Claims, 11 Drawing Sheets

(51) Int. Cl.
_H01M 50/247_ (2021.01)
_H01M 50/264_ (2021.01)

(56) References Cited

U.S. PATENT DOCUMENTS

| | | | | |
|---|---|---|---|---|
| 11,169,296 | B2* | 11/2021 | Nguyen | G01R 19/15 |
| 2006/0151189 | A1 | 7/2006 | Wu | |
| 2006/0267556 | A1* | 11/2006 | Uehlein-Proctor | B25F 5/00 |
| | | | | 320/132 |
| 2008/0099224 | A1* | 5/2008 | Hofmann | H01M 50/244 |
| | | | | 173/217 |
| 2009/0208827 | A1* | 8/2009 | Kondo | H01M 50/244 |
| | | | | 429/98 |
| 2010/0252294 | A1* | 10/2010 | Kondo | B25F 5/02 |
| | | | | 173/217 |
| 2013/0008682 | A1 | 1/2013 | Turner et al. | |

FOREIGN PATENT DOCUMENTS

| | | |
|---|---|---|
| CN | 203746928 U | 7/2014 |
| CN | 204621996 U | 9/2015 |
| CN | 205251427 U | 5/2016 |
| CN | 205852850 U | 1/2017 |
| CN | 207412120 U | 5/2018 |

\* cited by examiner

HANDHELD TOOL

TECHNICAL FIELD

The present disclosure relates to the field of cordless tools, and in particular, to a handheld tool.

BACKGROUND

With the development of the battery industry, lithium battery packs are widely used in power tools, garden tools, cleaning appliances, E-Bikes\balance bikes\scooters, UPSs\portable energy storage power supplies, and other fields. Most of the existing battery packs, especially in-line lithium battery packs used in cordless handheld tools, use a closed cover with a locking structure. The closed cover is provided with a bolt that matches a tool housing, and the closed cover is further provided with a finger-pressing surface. In this way, the disengagement and combination of the battery pack and the power tool can be controlled by a finger pressure of a power tool operator. For example, Chinese patent CN203746928U discloses "a battery pack, including: a cell, a connecting terminal, an inner housing, an outer housing, and a locking buckle, wherein the cell is disposed in the inner housing, the outer housing is provided with one end open and the other end closed, the outer housing is fixed to one end of the inner housing, the inner housing is partially disposed in the outer housing, and a terminal interface for connecting the connecting terminal to outside is provided at the other end of the inner housing; a part of the inner housing exposed outside the outer housing is provided with an insertion structure; and the outer housing is provided with an operation wall surface that can unlock the locking buckle when operated and lock the locking buckle in a free state". However, such a battery pack can be adapted to only specific types of tools. In addition, since the battery pack has a raised outer housing, the surface of the battery pack is not smooth, and after the battery pack is inserted into the tool, a section of the battery pack extends out of a battery compartment, resulting in an elongated size of the tool. Moreover, when mounting or taking out the battery pack, the user needs to hold the tool with one hand and press with fingers of the other hand to remove the battery pack from the battery compartment. This operation of manually removing the battery pack is time-consuming and labor-consuming, cumbersome, and inconvenient to use, which needs to be improved.

SUMMARY

An objective of the present disclosure is to provide a battery pack and a handheld tool using the battery pack. A surface of a housing of the battery pack is a continuous and complete surface, there is no detached edge on the side surface of the battery pack, and there is no raised portion on the housing at both ends of the battery pack, such that the battery pack is convenient for carrying and has better adaptability. A battery pack ejection mechanism is provided in the handheld tool, such that it is convenient for a user to mount and remove a battery.

The present disclosure provides a battery. The battery includes a battery housing and a cell provided in the battery housing, the battery housing includes a basal body and an end cover, and the end cover is disposed at an opening end of the basal body for closing the basal body.

Furthermore, a side edge of the end cover is adjacent to a side surface of the basal body. Preferably, the edge of the end cover is not higher than the side surface of the basal body, or the edge of the end cover does not protrude from the side surface of the basal body.

Optionally, the end cover is of a "convex" structure, and the edge of the end cover is flush with the side surface of the basal body.

Optionally, the basal body is of a tubular structure having openings at both ends, the end cover is disposed inside the opening end of the basal body, and a plane of the end cover is adjacent to planes of the openings of the basal body. Preferably, the plane of the end cover is lower than the planes of the openings of the basal body.

Optionally, the basal body is of a cup-shaped structure having an opening at one end, the end cover is disposed inside the opening end of the basal body, and the plane of the end cover is lower than a plane of the opening of the basal body.

Furthermore, a sealing member is provided between the basal body and the end cover. Optionally, the sealing member is, for example, a sealing ring, and an annular groove is provided on a side wall of the end cover for accommodating the sealing ring.

Furthermore, the end cover and the basal body are made of hard plastic, the end cover and the basal body are fixedly connected through laser welding/ultrasonic welding, and the sealing ring and the connection mode can prevent dust and/or liquid from entering the battery.

Furthermore, a fool-proof structure is provided on at least one end of the battery for avoiding the reverse insertion of the battery during use. Optionally, the battery extends outward from the outer surface of one end of the basal body, such that the reverse insertion of the battery in the case of blind insertion can be avoided. In addition, the fool-proof structure prevents the battery from continuing to be inserted after the battery is inserted into an appropriate position to avoid damage to other components in a battery compartment due to excessive insertion of the battery.

Furthermore, an indicator lamp is provided on the end cover for displaying the charging state and surplus power of the battery. Optionally, a through hole (groove) is provided on the end cover, and the indicator lamp inside the battery passes through the through hole (groove).

Furthermore, an input interface is provided on the battery for charging the battery.

Furthermore, a first output interface is provided on the battery, and the battery is electrically connected to the tool through the output interface for supplying power to the handheld tool.

Furthermore, a second output interface is provided on the battery, and the battery can charge a mobile device after being removed from the battery compartment of the tool. The battery has a smooth surface and is convenient to carry.

Furthermore, the battery described in the present disclosure should be understood as a battery pack, there may be a single cell or a plurality of cells inside the battery pack, and a control board is provided inside the battery pack for managing the battery.

Furthermore, a positioning hole is provided on the basal body of the battery housing for achieving the effect of locking and fixing the battery pack when the battery pack is placed into the tool. The present disclosure further provides a handheld tool. The handheld tool may be a handheld tool using a lithium battery pack, such as a power tool, a garden tool, and a cleaning tool.

The handheld tool includes a housing, a power system, a battery cavity structure, and a battery. An accommodating cavity is provided in the housing. The power system is disposed in the accommodating cavity and includes a drive device and a transmission mechanism. The battery cavity structure is disposed in a holding portion of the power tool and includes a battery compartment capable of accommodating the battery and allowing the battery to be inserted in and pulled out, an ejection mechanism, and a locking mechanism. The battery compartment is provided with an outlet, the ejection mechanism is mounted at an end opposite to the outlet of the battery compartment, and the locking mechanism is configured to limit the battery disposed in the battery compartment to restrict the battery from coming out from the outlet of the battery compartment. The battery is mounted in the battery compartment in a pluggable manner.

Furthermore, the battery is disposed in the battery compartment, and an end surface of the battery close to a side of the end surface of the outlet of the battery compartment is adjacent to the end surface of the outlet of the battery compartment.

Preferably, the battery is disposed in the battery compartment, and the end surface of the battery is not higher than the end surface of the outlet of the battery compartment. Of course, the end surface of the battery can also slightly protrude from the end surface of the outlet of the battery compartment, as long as the use of the user and the aesthetics of the power tool are not affected, for example, the end surface of the battery protrudes 1-10 mm from the outlet of the battery compartment.

Furthermore, a controller is further provided in the accommodating cavity of the tool housing, and the controller is electrically connected to the battery and a power system for controlling the operation of the tool.

Furthermore, the accommodating cavity is communicated with the battery compartment. Optionally, the battery compartment is a part of the accommodating cavity, and the housing is formed by assembling at least two housing elements.

Furthermore, a guide portion is further provided in the battery compartment for guiding the battery to be assembled into the battery compartment, and at this time, an output interface of the battery is matched with a power-consuming plug of the tool. Optionally, a gap between the battery pack inserted into the battery compartment and the battery compartment is small, and an inner wall of the battery compartment is equivalent to a guide structure.

Optionally, the locking mechanism is mounted at the outlet end of the battery compartment. The locking mechanism includes a button provided at a lower end of the tool holding portion and configured to control the ejection of the battery out of the battery compartment.

Furthermore, the locking mechanism further includes a latch (a latch lock and a bolt), and the latch is matched with the positioning hole (latch groove) on the battery housing for locking or unlocking the battery.

Optionally, the locking mechanism is mounted at the end opposite the outlet of the battery compartment.

Furthermore, a press-type ejection mechanism is further provided at the end opposite to the outlet of the battery compartment or in the vicinity of the locking mechanism, such that the battery is received into the battery compartment and ejected out of the battery compartment along with a press cycle.

Furthermore, after the battery is inserted into the battery compartment, the end surface of the battery close to the outlet end of the battery compartment and the end surface of the outlet of the battery compartment are basically on the same plane, and the end surface of the battery constitutes a part of a lower bottom surface of the tool holding portion.

Optionally, after the battery is inserted into the battery compartment, the end surface of the battery close to the outlet end of the battery compartment is lower than the end surface of the outlet of the battery compartment.

In the present disclosure, the term "lower than" can be understood as "not protruding", and the term "higher than" can be understood as "protruding".

According to the present disclosure, there is no need to provide a bolt at the periphery of the housing of a battery pack for handheld tools, thereby avoiding a protrusion on the surface of the battery pack. In addition, after the battery pack is inserted, the surface of the tool housing is not exposed, which reduces the size of the tool and makes the tool smaller. The battery pack of the present disclosure includes an interface for supplying power to the mobile device, such that the battery pack can serve as a power bank after being removed. The battery pack has a smooth surface and is convenient to carry. The handheld tool of the present disclosure is internally provided with the ejection structure and the locking structure matched with the battery pack, such that the battery pack is mounted and disassembled more conveniently. After the battery is inserted, there is no detached edge between the battery and the surface of the tool housing, such that the surface of the tool is more artistic.

BRIEF DESCRIPTION OF THE DRAWINGS

FIG. 5-1 is a partial, exploded schematic diagram of a battery shown in an exemplary embodiment of the present disclosure;

FIG. 5-2 is a partial, exploded schematic diagram of a battery shown in an exemplary embodiment of the present disclosure;

Figure 1:
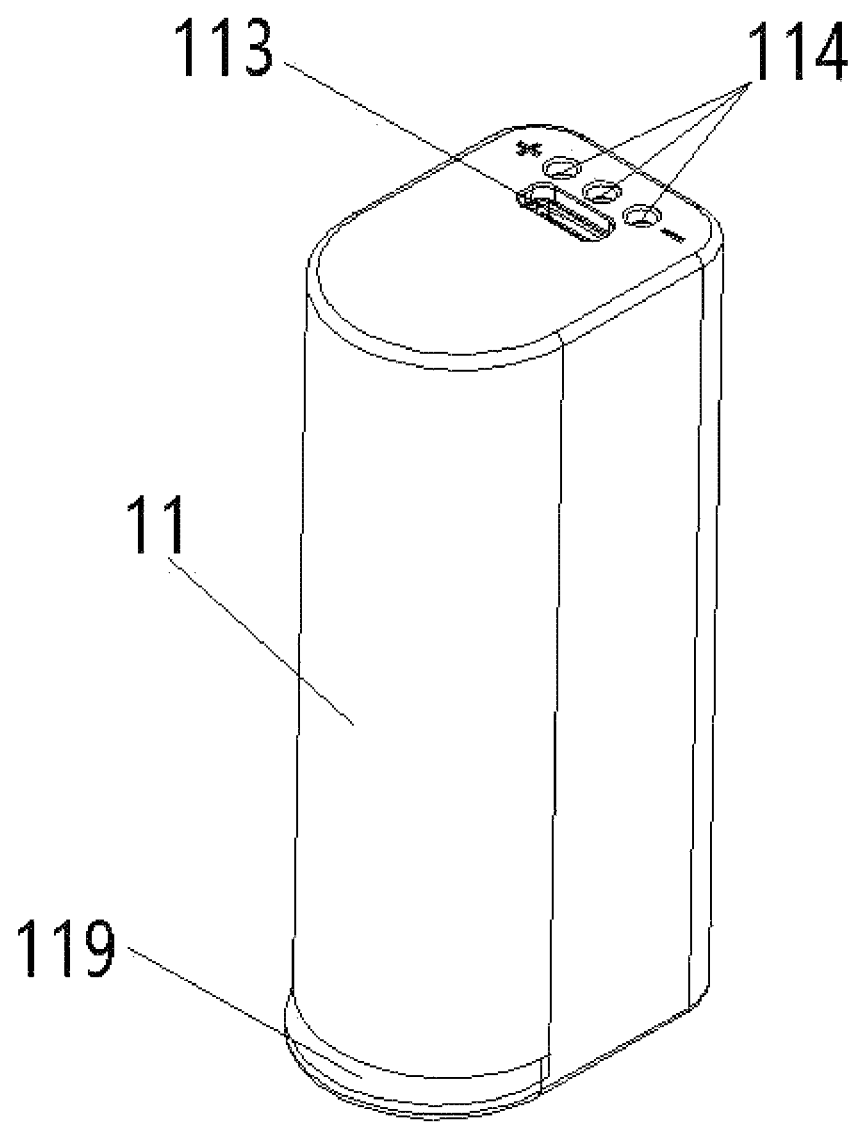
FIG. 1 is a schematic structural diagram of a battery shown in an exemplary embodiment of the present disclosure.

Reference Numerals: 1-Battery; 11-Battery housing; 10-Cell; 110-Basal body; 111-End cover; 112-Sealing member; 113-Input interface; 114-First output interface; 115-Second output interface; 116-Button; 117-Indicator lamp; 118-Positioning hole; 119-Fool-proof structure; 2-Tool housing; 20-Holding portion; 3-Battery cavity structure; 30-Battery compartment; 31-Locking structure; 310-Button; 311-Bolt; 312-Spring; 32-Ejection mechanism; 320-Fixed plate; 321-Sliding member; 322-Spring; 4-Power system; 323-Fixed block; 3230-Stopper; 324-Moving member; 322-Elastic member; 313-Sleeve; 314-Sliding base.

DETAILED DESCRIPTION OF THE EMBODIMENTS

The present disclosure is described in more detail below in conjunction with the accompanying drawings. It should be noted that the following description of the present disclosure with reference to the accompanying drawings is only illustrative and not restrictive. Various embodiments can be combined with each other to form other embodiments not shown in the following description.

For the convenience of description, the handheld tool of the present disclosure takes an electric drill and a fascia gun as embodiments. Of course, the handheld tool can also be other tools, such as a screwdriver, or a multifunctional tool with the functions of the screwdriver and the electric drill. Or, the tool can also be a tool that can convert an outputted torque into other forms of motions. These tools may be configured to grind workpieces, such as a sander and an angle grinder. These tools may also be configured to cut the workpieces, such as a reciprocating saw, a circular saw, and a curved saw. These tools may also be used for impacting, such as an electric hammer. These tools may also be garden tools, such as a pruning machine and a chainsaw. In addition, these tools may also be used for other purposes, such as a mixer, a vacuum cleaner, and a massager. As long as battery packs are provided in the holding portions of these tools, the essential content of the technical solutions disclosed below may be adopted.

EMBODIMENT 1

Referring to FIG. 1 to FIG. 5-2, battery pack 1 of the present disclosure includes a cell and battery housing 11. The battery housing 11 includes basal body 110 and at least one end cover 111. As a preferred solution, the basal body 110 and the end cover 111 are both made from a plastic material.

The basal body 110 is formed with a cavity having an opening on at least one end. The cell, a connecting terminal, and a related circuit board are provided in the basal body 110. The end cover 111 is disposed at an opening end of the basal body 110 for closing the basal body 110. Preferably, the end cover 111 is embedded in the opening end of the basal body 110 and fixedly connected to the same. There are many modes for a fixed connection between the end cover 111 and the basal body 110. Optionally, the end cover 111 and the basal body 110 are clamped together through an annular groove and a protrusion. Of course, the end cover 111 and the basal body 110 may also be fixedly connected through welding, bonding, or integral forming.

When the end cover 111 and the basal body 110 are fixed together, the side edge of the end cover 111 is not higher than the side surface of the basal body 110. Compared with the existing in-line battery pack 1, the surface of the battery pack 1 of the present disclosure is smoother. As long as the holding portion of the tool is provided with a battery compartment of the same size, the battery can be inserted, such that there is no need to consider the shape and size of a handle of the holding portion, and adaptability is better.

Figures 1, 5:
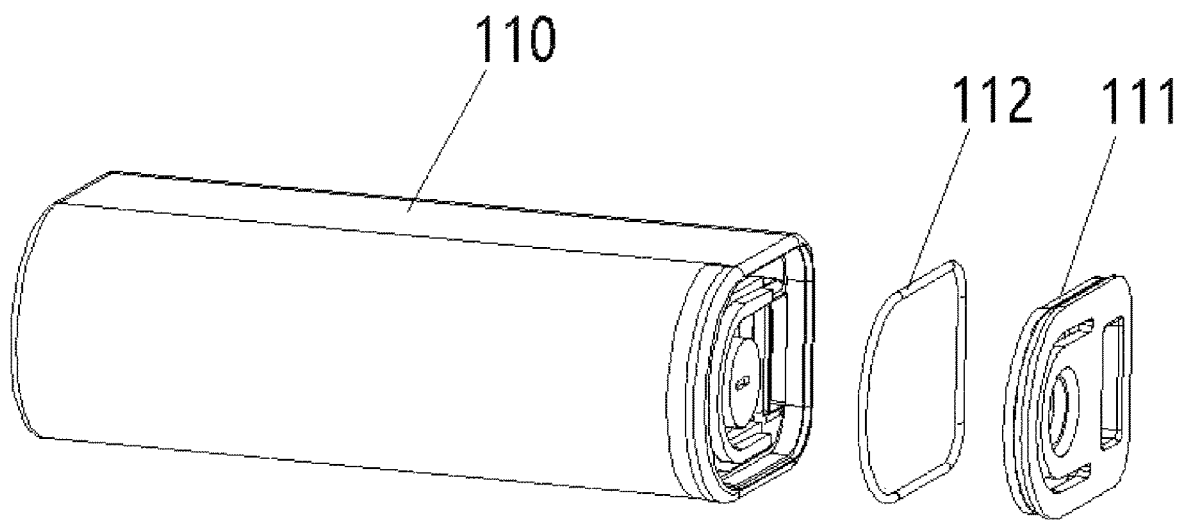
Figures 2, 5:
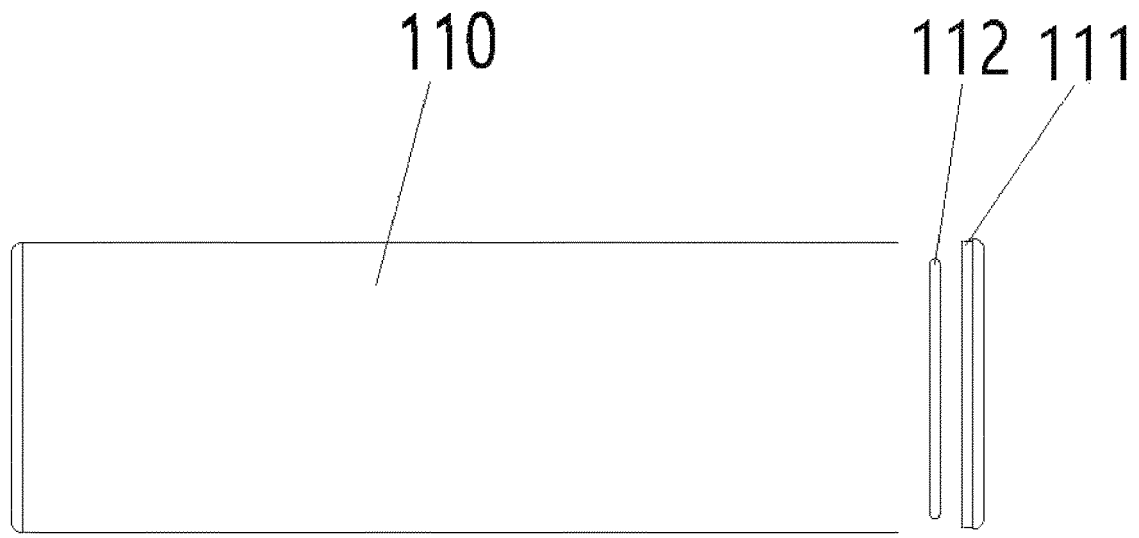
Figure 6:
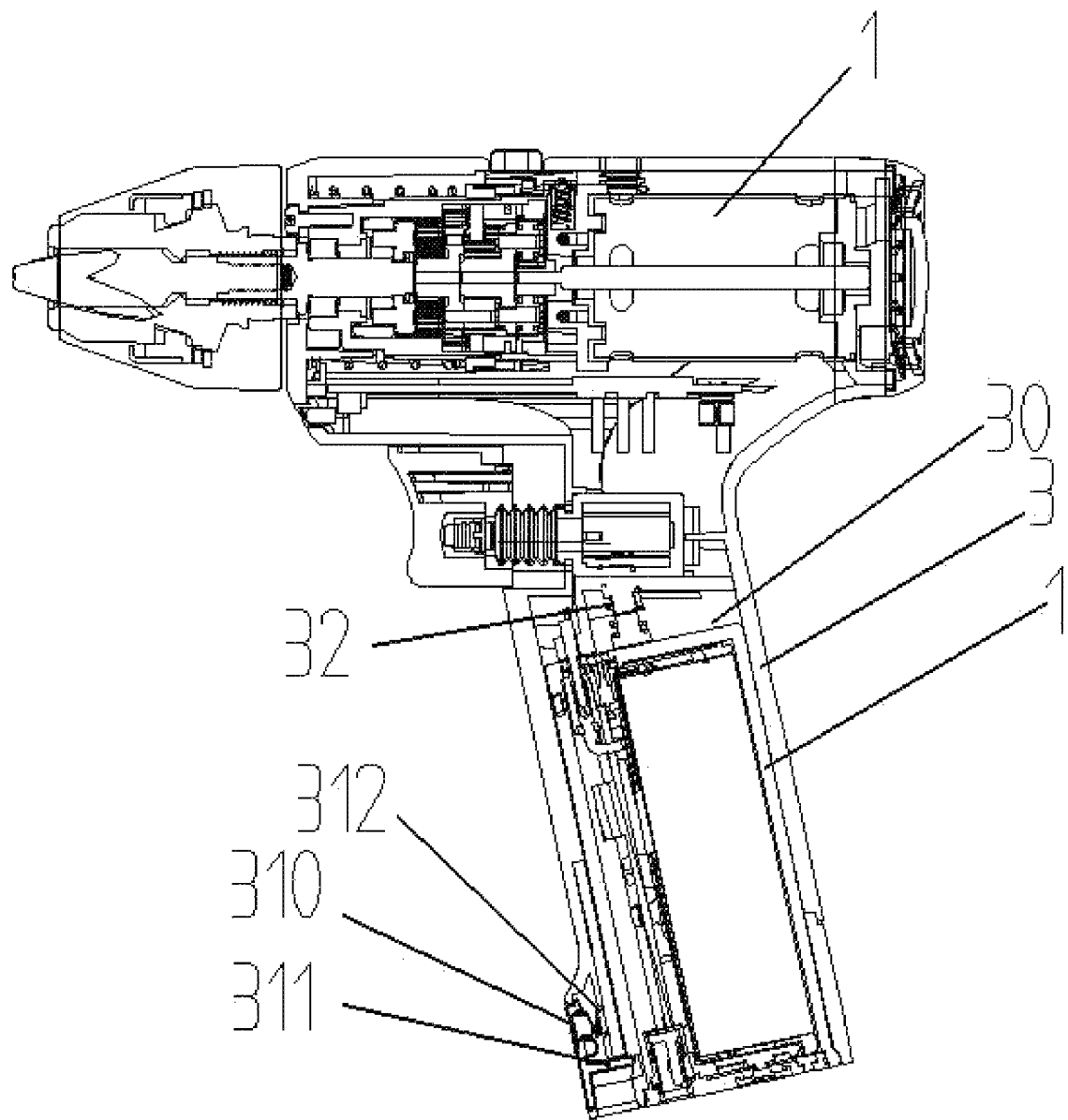
FIG. 6 is a sectional view of a handheld tool in an exemplary embodiment of the present disclosure.
Figure 7:
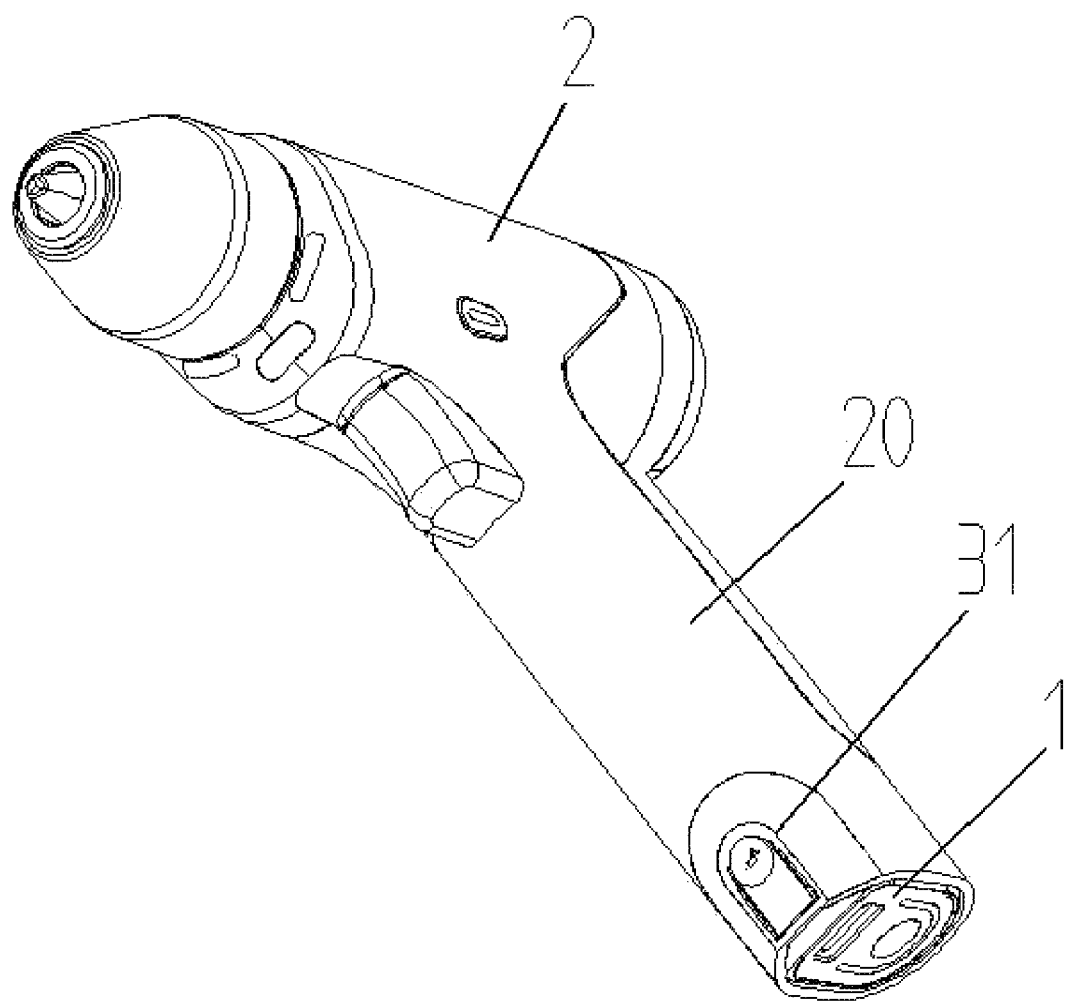
FIG. 7 is a stereogram of a handheld tool in an exemplary embodiment of the present disclosure.
Figure 8:
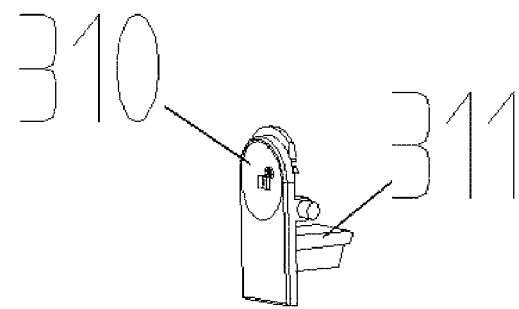
FIG. 8 is a schematic structural diagram of a locking button in an exemplary embodiment of the present disclosure.
Figure 9:
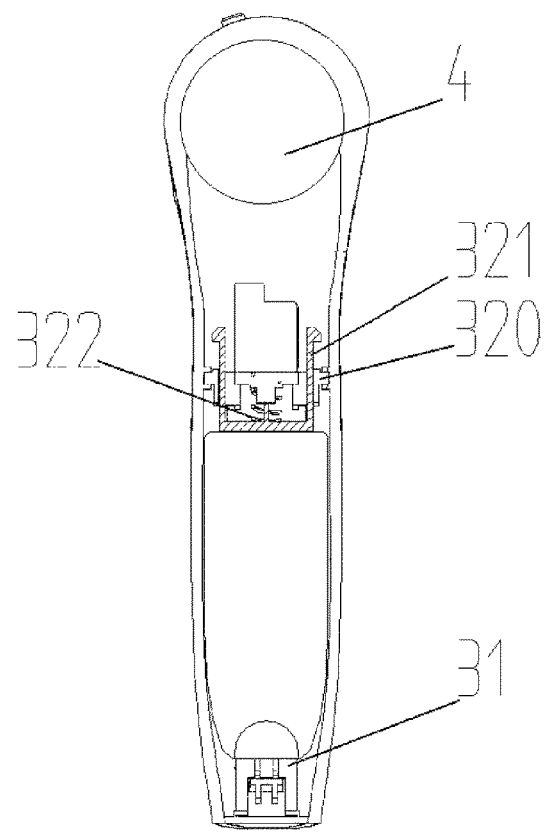
FIG. 9 is a sectional view of a handheld tool in an exemplary embodiment of the present disclosure.
Figure 10:
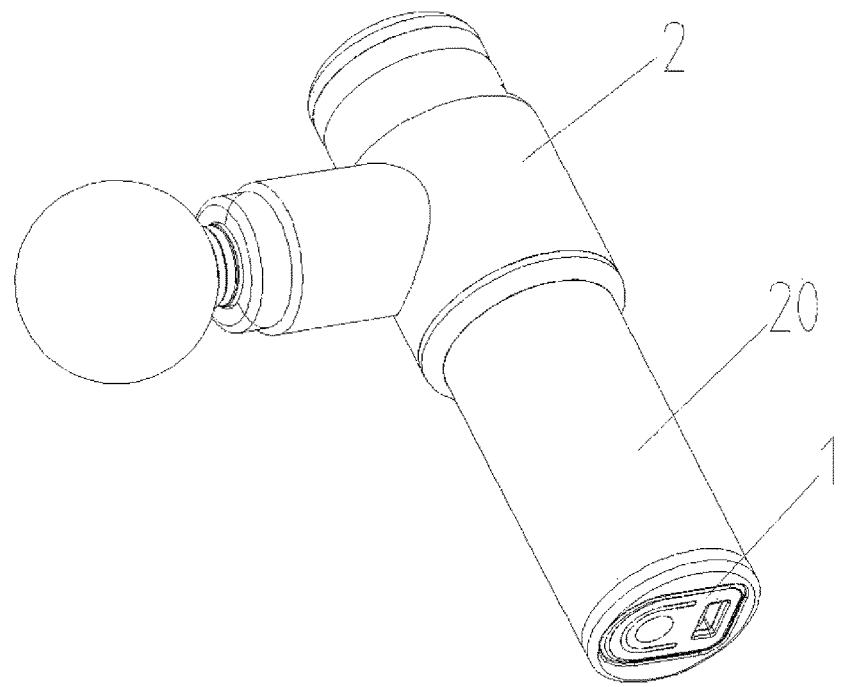
FIG. 10 is a stereogram of a handheld tool in an exemplary embodiment of the present disclosure.
Figure 11:
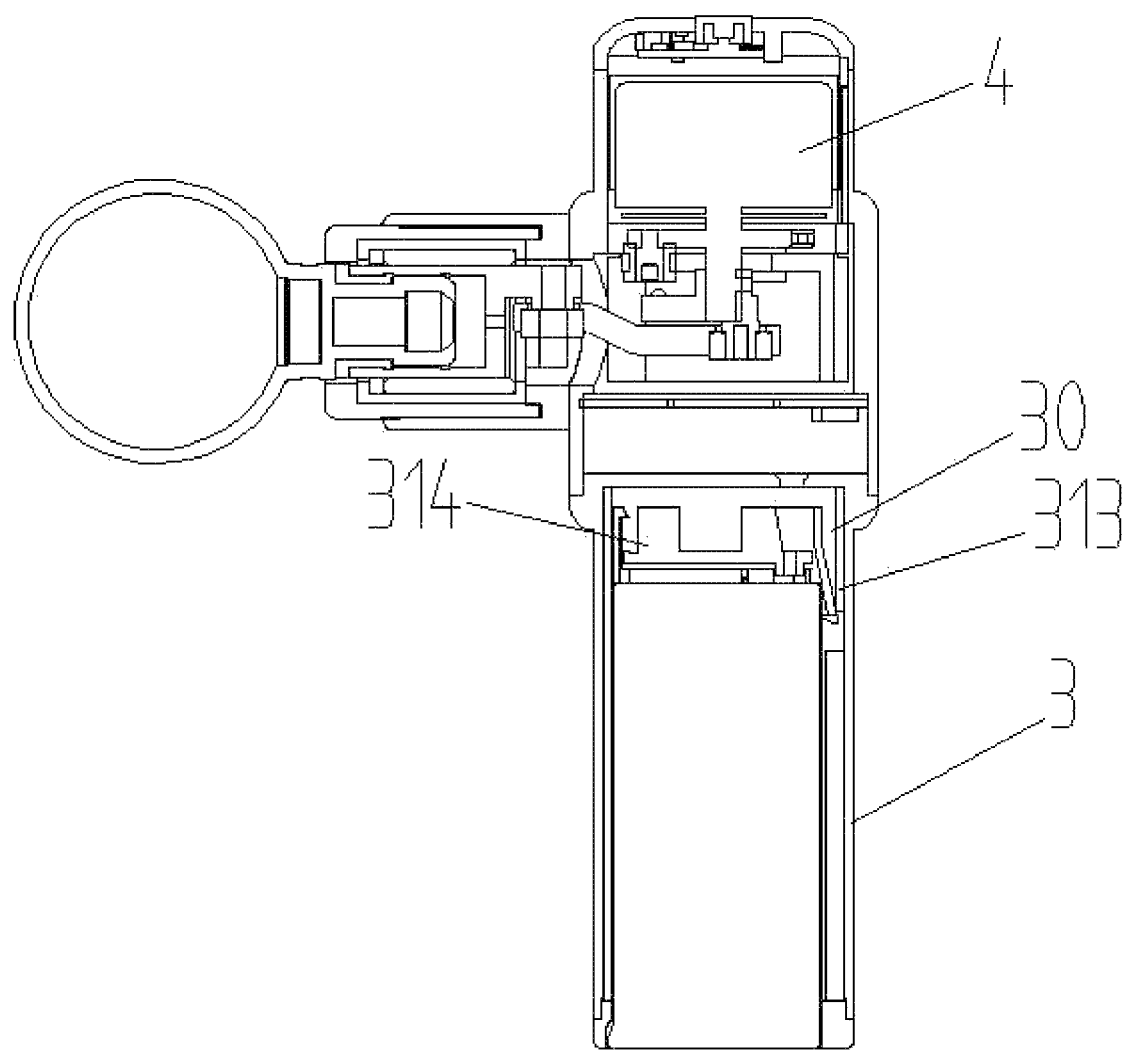
FIG. 11 is a sectional view of a handheld tool in an exemplary embodiment of the present disclosure.
Figure 12:
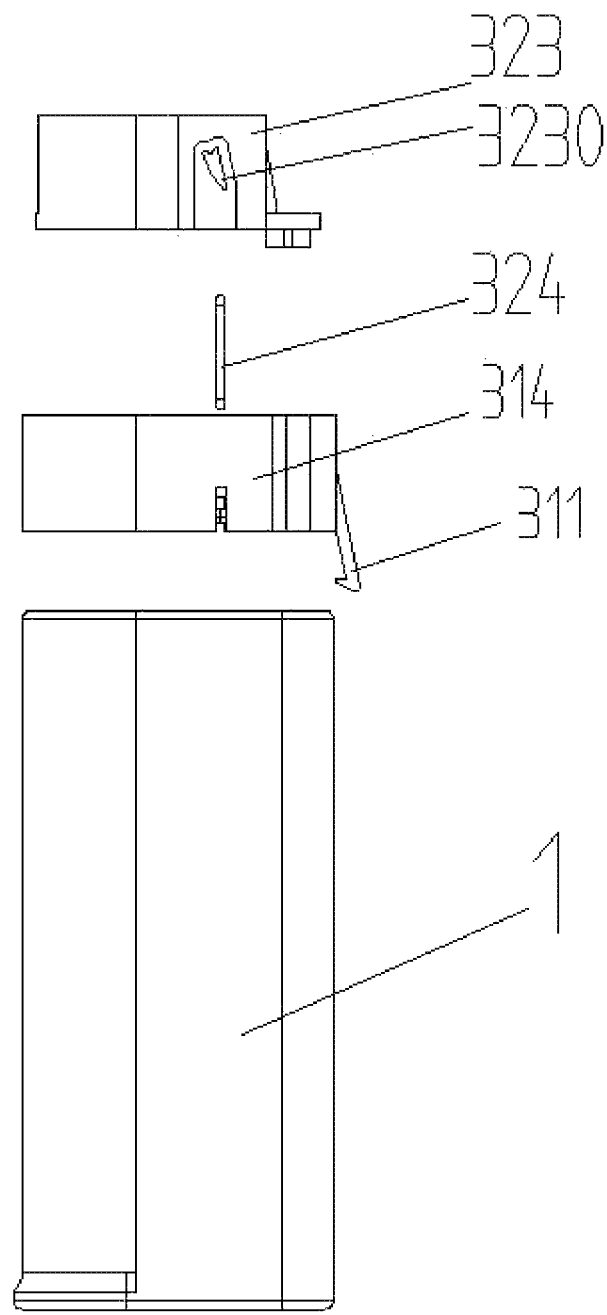
FIG. 12 is a partial, exploded schematic diagram of a battery cavity structure shown in an exemplary embodiment of the present disclosure.
Figure 13:
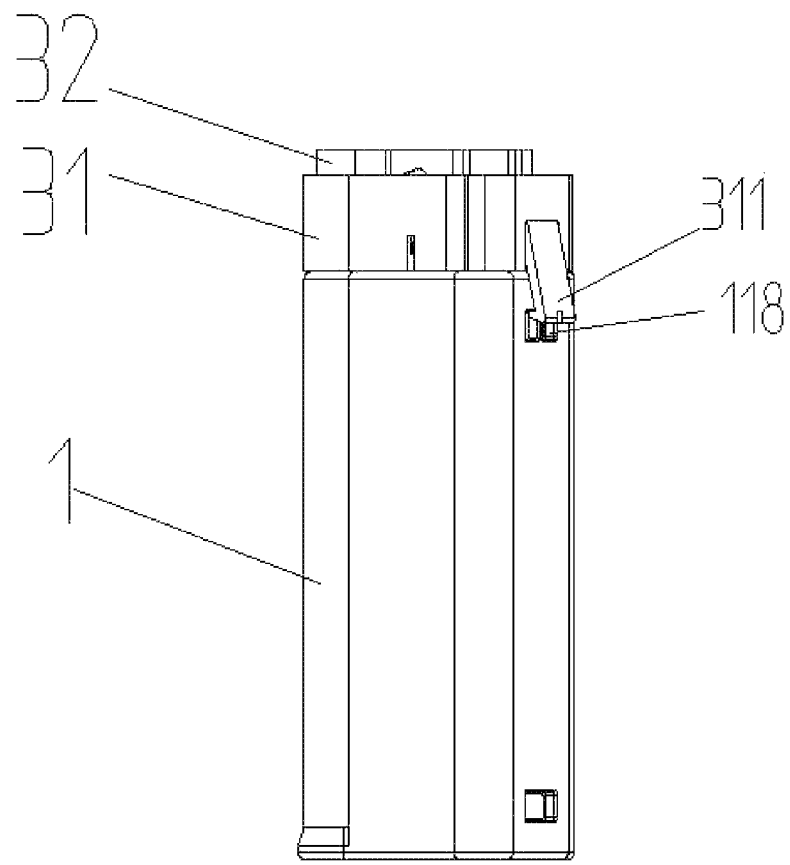
FIG. 13 is a partial schematic diagram of a battery cavity structure in an exemplary embodiment of the present disclosure.
Figure 14:
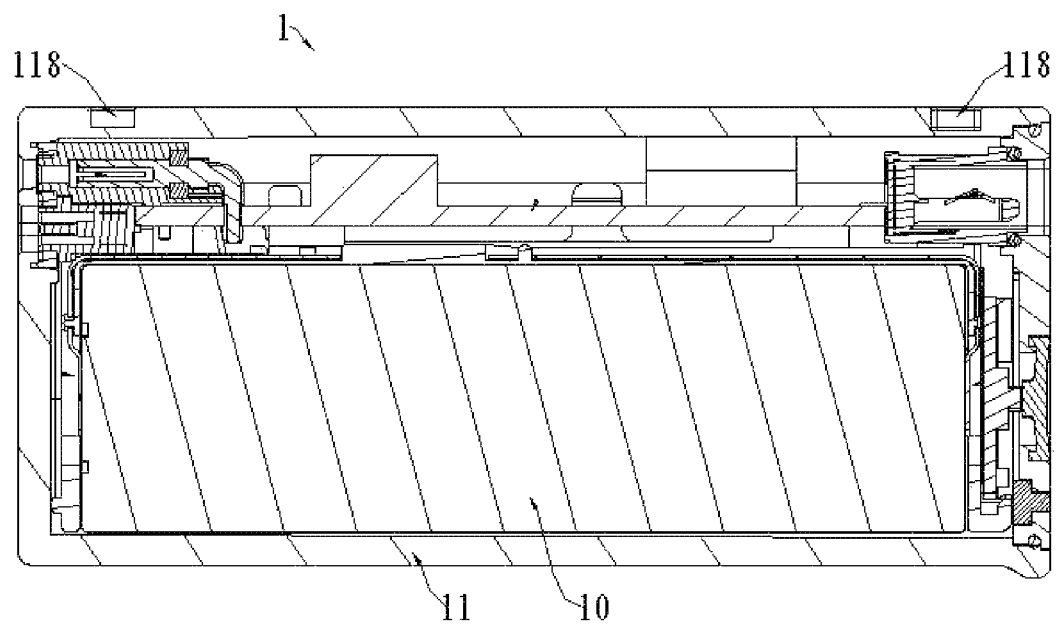
FIG. 14 is a schematic structural diagram of a battery shown in an exemplary embodiment of the present disclosure.

As shown in FIG. 5-1, the basal body 110 is of a cup-shaped structure having an opening at one end; the end cover 111 is embedded in the opening end of the basal body 110. After the end cover 111 is mounted to the basal body 110, the bottom surface of the end cover 111 is flush with the end surface of the opening of the basal body 110 or lower than the plane of the opening of the basal body 110.

Figure 2:
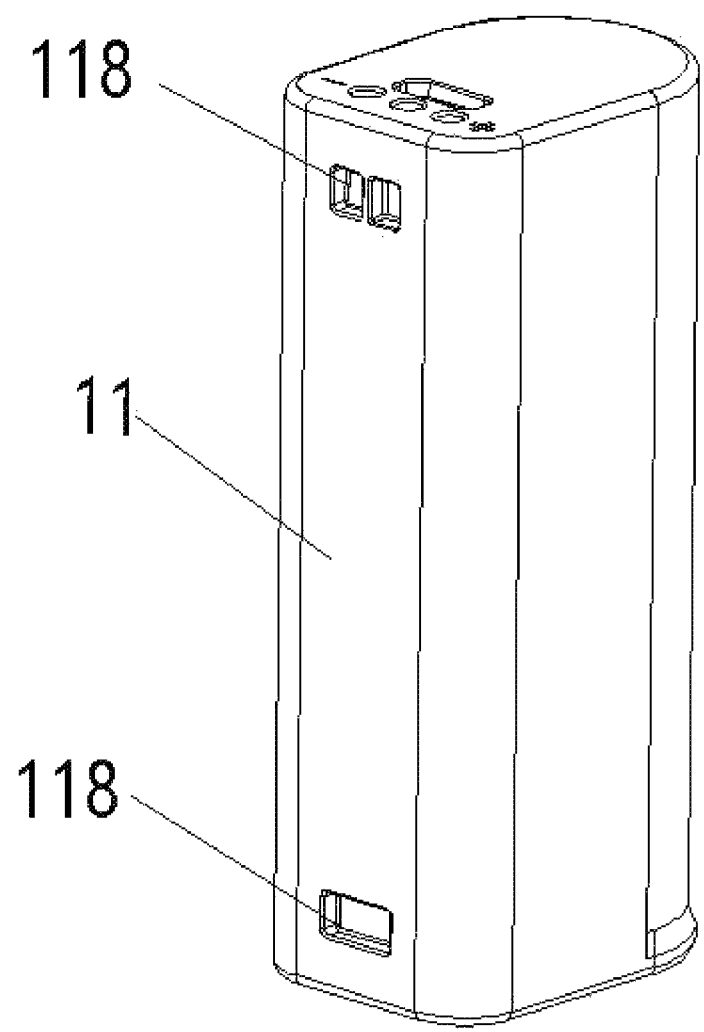
FIG. 2 is a schematic structural diagram of a battery shown in an exemplary embodiment of the present disclosure.

As shown in FIG. 5-2, the basal body 110 is of a cup-shaped structure having an opening at one end, and the end cover 111 is of a "convex" structure. One part of the end cover 111 is embedded in the opening end of the basal body 110, the other part of the end cover 111 protrudes from the opening end of the basal body 110, and an edge of the part of the end cover 111 protruding from the opening end of the basal body 110 is flush with the side surface of the basal body 110.

Optionally, the basal body 110 may also be of a tubular structure having openings at both ends; the end cover 111 is embedded in the opening end of the basal body 110. After the end cover 111 is mounted to the basal body 110, the bottom surface of the end cover 111 is flush with the end surface of the opening of the basal body 110 or lower than the plane of the opening of the basal body 110.

The battery pack 1 of the present disclosure does not need to be provided with a bolt that matches the tool on the side surface of the battery pack 1, such that a protrusion on the surface of the battery pack 1 is avoided, the battery pack can be carried more conveniently, the structure of the battery is more compact, and the volume is smaller.

Sealing member 112 is further provided between the basal body 110 and the end cover 111. Preferably, the sealing member 112 is a sealing ring made from a rubber material, and an annular groove is provided on a side wall of the end cover 111 for accommodating the sealing ring.

The end cover 111 and the basal body 110 are made of hard plastic, and the end cover 111 and the basal body 110 are firmly connected through ultrasonic welding, such that the sealing effect is better, and dust and/or water can be prevented from entering the battery pack 1.

Fool-proof structure 119 is provided at an end of the battery opposite to an insertion end. As shown in the figure, the fool-proof structure 119 may be a protrusion portion extending outward from the outer surface of one end of the basal body 110 to avoid reverse insertion of the battery in the case of blind insertion.

Figure 3:
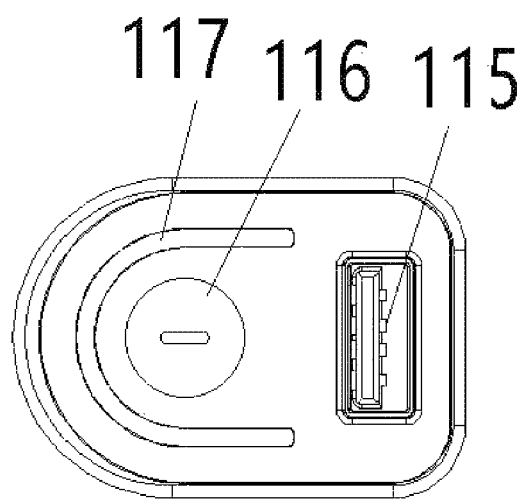
FIG. 3 is a bottom view of a battery shown in an exemplary embodiment of the present disclosure.
Figure 4:
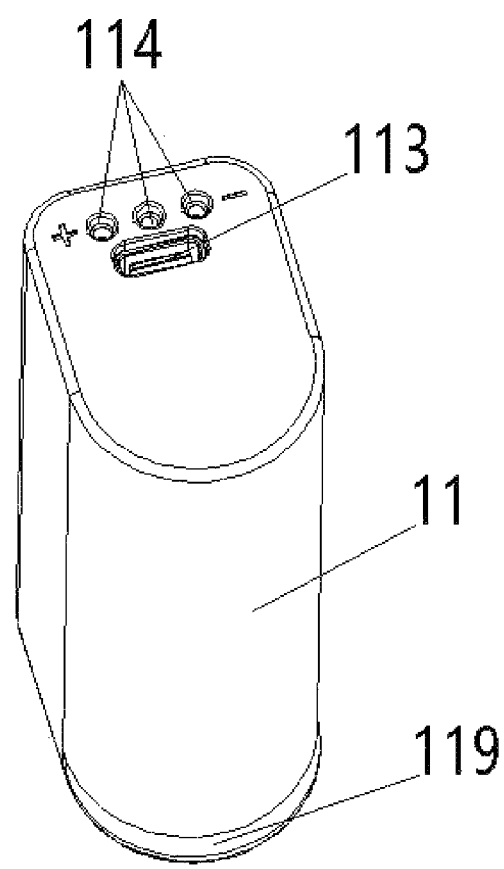
FIG. 4 is a schematic structural diagram of a battery shown in an exemplary embodiment of the present disclosure.

Indicator lamp 117 is provided on the end cover 111 for displaying a charging state and surplus power of the battery pack 1. As shown in FIG. 3, a U-shaped hole is provided on the end cover 111, and the indicator lamp 117 connected to a circuit board inside the battery pack 1 passes through the U-shaped hole.

The battery pack 1 is provided with input interface 113 for charging the battery pack 1. Preferably, the input interface 113 is a USB-C interface having better flexibility and compatibility.

The battery pack 1 is provided with first output interface 114 for supplying power to the tool using the battery pack 1. The first output interface 114 includes positive and negative electrode interfaces and a signal electrode interface. A circuit control system on the tool can monitor the temperature of the battery pack 1 and the voltage of a single cell in the battery pack 1 through a signal electrode. The first output interface 114 can supply power to a high-power power-consuming tool, which meets intermittent/short-time/high-current discharge requirements of a lithium battery tool and can also meet the working requirements of continuous discharge.

The battery pack 1 is provided with second output interface 115 for charging other common electronic products that are carried around for emergency use. The second output interface 115 is a USA-A interface.

The battery pack 1 contains one or more cells, which can be connected in series and/or in parallel and can be stacked vertically or horizontally. A battery management system (BMS) built into the battery pack 1 is provided with a charge management chip. The charge management chip has overvoltage, overcharge, overdischarge, short circuit, and temperature protection functions and is configured to adjust a voltage and/or a current connected into a charge interface, such that a charge current and/or a charge voltage meet a current and/or a voltage required by the lithium battery pack 1.

Positioning hole 118 is provided on the surface of the housing of the battery pack 1 for achieving the effect of locking and fixing the battery pack 1 when the battery pack 1 is placed into the tool. There is no need to provide a circumferential buckle on the surface of the battery pack 1, such that the battery pack 1 is more portable, and the battery pack 1 can serve as a power bank when the tool is not in use.

Control key 116 is further provided at the end cover 111 for controlling the on and off of the second output interface 115 and also controlling the display and turn-off of indicator lamp 117.

EMBODIMENT 2

Referring to FIG. 6 to FIG. 9, the present disclosure provides a first embodiment of a handheld tool, which includes tool housing 2, power system 4, battery cavity structure 3, and a battery pack inserted into the tool housing 2.

The tool housing 2 is formed by fixedly connecting at least two housing elements and is provided with an accommodating cavity. The battery cavity structure 3 is located at holding portion 20 of the tool and includes battery compartment 30 capable of accommodating a battery and allowing the battery to be inserted in and pulled out, ejection mechanism 32, and a locking mechanism. The battery compartment 30 is a part of the accommodating cavity and is provided with an outlet. The ejection mechanism 32 is mounted at an end opposite the outlet of the battery compartment 30. The locking mechanism is configured to limit the battery disposed in the battery compartment 30 to restrict the battery from coming out of the outlet of the battery compartment 30. The battery is mounted in the battery compartment 30 in a pluggable manner. The power system 4 is disposed in the accommodating cavity and includes a drive device and a transmission mechanism.

After the battery pack is inserted into the cavity of the battery compartment 30 of the tool, the lower end surface of the battery pack is not higher than the end surface of the outlet of the battery compartment 30. Preferably, after the battery pack is inserted into the cavity of the battery compartment 30, the lower end surface of the battery pack is flush with the end surface of the outlet of the battery compartment 30, and the lower end surface of the battery pack constitutes a part of the lower bottom surface of the tool holding portion 20.

A circuit board is further provided in the accommodating cavity of the tool housing 2, and the circuit board is electrically connected to the battery pack and the power system 4 for controlling the discharge of the battery pack and the operation of the power system 4.

The tool housing 2 includes holding portion 20, and the battery compartment 30 in the holding portion 20 is communicated with the accommodating cavity. In this embodiment, the battery compartment 30 is a part of the accommodating cavity, and the tool housing 2 is formed by assembling two housing elements.

The locking mechanism is disposed at a position, close to the outlet of the battery compartment 30, of the lower end of the tool holding portion 20, and is movably connected to the positioning hole 118 on the battery pack for locking or unlocking the battery pack. In this embodiment, there may be a plurality of forms of embodiments of the locking mechanism. Specifically, referring to FIG. 6 to FIG. 12, the locking structure 31 includes bolt 311, button 310, and spring 312. The bolt 311 has a working state of protruding to restrict the battery pack from coming out from the outlet of the battery compartment 30. The spring 312 is connected to the bolt 311 for driving the bolt 311 to stretch and retract. When the button 310 is pressed, the bolt 311 retracts to unlock the battery pack, and at this time, the battery compartment 30 of the battery pack is ejected under the action of the ejection mechanism 32. After the battery is placed in, the bolt 311 automatically resets under the action of the spring 312 and is inserted into the positioning hole 118 on the battery pack to lock the battery pack in the battery compartment 30. When a user needs to disassemble the battery pack, the user only needs to press the button 310 lightly with fingers, and the battery compartment 30 of the battery pack can be ejected, which is more convenient.

The locking mechanism includes a limiting rod and a telescopic drive device. The limiting rod is arranged telescopically. One end of the limiting rod is arranged close to the opening of the battery compartment 30, and the limiting rod has a working state of protruding to restrict the battery from coming out from the opening of the battery compartment 30. The telescopic drive device drives the limiting rod to stretch and retract. The limiting rod stretches to block the opening, which can effectively prevent the battery from falling out through the opening. The button 310 is pressed down to retract the limiting rod, such that the battery is conveniently removed. After the battery is inserted, the limiting rod stretches to lock the battery in the battery compartment 30.

The ejection mechanism 32 is disposed at the end opposite to the battery compartment 30 and includes fixed plate 320, spring 312, and sliding member 321. When the battery pack is inserted into the battery compartment 30, the sliding member 321 moves upward, and the spring 312 is compressed. When the locking mechanism unlocks, the spring 312 is configured to reset the sliding member 321 for ejecting the battery pack out of the battery compartment 30.

The opening end of the battery compartment 30 can allow only the end of the battery pack without the fool-proof structure to be inserted in. After the battery pack is inserted, the first output interface of the battery pack is connected to the power-consuming interface of the tool for supplying power to the tool.

EMBODIMENT 3

Referring to FIG. 10 to FIG. 13, the embodiment of the present disclosure provides a handheld tool capable of ejecting a battery pack by pressing one end of a battery to remove the battery pack from battery compartment 30.

The handheld tool includes specific structures of tool housing 2, power system 4, battery compartment 30, a cavity structure, and a battery pack. An accommodating cavity is provided in the tool housing 2. The power system 4 is disposed in the accommodating cavity and includes a drive device and a transmission mechanism. The battery cavity structure 3 is disposed on holding portion 20 of the power tool and includes battery compartment 30 capable of accommodating a battery and allowing the battery to be inserted in and pulled out, ejection mechanism 32, and a locking mechanism. The battery compartment 30 is composed of a tubular housing having openings at both ends and is provided with one end fixedly connected to the tool housing 2 and the other end for allowing the battery to be inserted in and pulled out. The ejection mechanism 32 is a press-type ejection mechanism and is mounted at the end opposite the outlet of the battery compartment 30. The locking mechanism is configured to limit the battery disposed in the battery compartment 30 to restrict the battery from coming out from the outlet of the battery compartment 30. The battery is mounted in the battery compartment 30 in a pluggable manner.

After the battery pack is inserted into the battery compartment, the lower end surface of the battery and the lower end surface of the battery compartment 30 are basically within the same plane.

The locking mechanism 31 is disposed at the end opposite to the outlet of the battery compartment 30 and includes sleeve 313, sliding base 314, and bolt 311 provided on the sliding base 314. The sleeve 313 is provided with a notch. When the bolt 311 on the sliding base 314 slides to the notch, the bolt 311 is separated from the positioning hole 118 on the battery pack, and the battery pack can be removed from the battery compartment 30. When the bolt 311 leaves the notch, the bolt 311 is squeezed by the sleeve 313 and then works in conjunction with the positioning hole 118 on the battery pack to fix the battery pack in the battery compartment 30.

The ejection mechanism 32 includes fixed block 323 provided on the sliding base 314. The fixed block 323 is fixedly connected to the upper end of the sleeve 313, and beveled heart stopper 3230 is provided on the side surface of the fixed block 323. The ejection mechanism 32 further includes moving member 324 passing through the sliding base 314 and matching the stopper 3230 on the fixed block 323. The moving member 324 is provided with one end abutting against the battery pack and the other end matching the stopper 3230. The ejection mechanism 32 further includes elastic member 322 provided inside the fixed block 323 for pushing the sliding base 314 to slide up and down. The elastic member 322 drives the sliding base 314 to move up and down, thereby controlling cooperation between the bolt 311 and the positioning hole 118 on the battery pack to lock or unlock the battery. The fixed block 323 and the sliding base 314 are provided with connection structures matching each other. The fixed block 323 can only move within a certain stroke relative to the sliding base 314.

The fixed block 323 is further provided with a tool terminal. The terminal is connected to the first output interface of the battery pack for supplying power to the tool.

A sliding rail is arranged around the stopper 3230. When the battery pack is pressed, the moving member 324 moves unidirectionally in the sliding rail.

According to a press ejection mechanism of the present disclosure, when the battery pack is inserted into the battery compartment 30, the moving member 324 is located at a recessed position of the stopper 3230. At this time, the elastic member 322 is compressed, and the bolt 311 works in conjunction with the positioning hole 118 on the battery pack to lock the battery. When the battery pack is pressed again, the moving member 324 moves downward along the sliding rail, and at this time, the elastic member 322 is released to drive the battery pack and the sliding base 314 to move downward. When the bolt 311 moves to the notch on the sleeve 313, the bolt 311 is separated from the positioning hole 118 on the battery pack, and at this time, the battery pack moves out of the battery compartment 30. When the battery is mounted again, the battery pushes the moving member 324 and the sliding base 314 to move upward, the bolt 311 is squeezed by the sleeve 313 to abut against the positioning hole 118 on the battery pack to fix the battery pack, at this time, the moving member 324 is also located at the recessed position of the stopper 3230, and the spring 312 is compressed. In this way, the battery is received in the battery compartment 30 and ejected out of the battery compartment 30 along with a press cycle.

After the battery pack is inserted into the battery compartment 30, the lower end surface of the battery pack and the lower end surface of the battery compartment 30 are basically on the same plane, and the lower bottom surface of the battery pack constitutes a part of the lower bottom surface of a tool holding end.

EMBODIMENT 4

This embodiment provides a battery pack. The battery pack includes battery housing 11 and a cell provided in the battery housing 11. The surface of the battery housing 11 includes first output interface 114 for supplying power to a tool, second output interface 115 for supplying power to a mobile device, and input interface 113 for charging the battery pack 1.

Furthermore, the surface of the battery housing 11 is smooth and has no detached edge.

Specifically, the battery housing 11 includes basal body 110 and end cover 111. The end cover is disposed at an opening end of the basal body 110 for closing the basal body 110.

Furthermore, the side edge of the end cover 111 of the battery housing 11 is not higher than the side surface of the basal body 110.

Optionally, the basal body 110 is of a tubular structure having openings at both ends, the end cover 111 is disposed inside the opening end of the basal body 110, and a plane of the end cover 111 is not higher than planes of the openings of the basal body 110.

Optionally, the basal body 110 is of a cup-shaped structure having an opening at one end, the end cover 111 is disposed inside the opening end of the basal body 110, and the plane of the end cover 111 is not higher than a plane of the opening of the basal body 110.

Furthermore, the surface of the battery housing 11 further includes positioning hole 118 for achieving an effect of fixing the battery pack when the battery pack is placed into the tool.

Furthermore, fool-proof structure 119 is provided on the surface of the battery housing 11 for avoiding the reverse insertion of the battery pack when the battery pack is placed into the tool.

Furthermore, indicator lamp 117 and control key 116 are provided on the surface of the battery housing 11. The indicator lamp 117 is configured to display a charging state and surplus power of the battery pack. The control key 116 is configured to control the on and off of the second output interface 115 and/or display and turn-off of the indicator lamp 117.

The present disclosure further provides a power tool. The power tool further includes battery compartment 30. The battery pack is mounted in the battery compartment 30 in a pluggable manner. The end surface of the battery is not higher than the end surface of the outlet of the battery compartment 30.

EMBODIMENT 5

This embodiment provides a fascia gun. The fascia gun includes a battery compartment provided on a fascia gun holding portion. A battery ejection mechanism is provided in the battery compartment. The battery ejection mechanism abuts one end of a battery. A locking mechanism for controlling the ejection of the battery is provided at an outlet end of the battery compartment.

Furthermore, the battery ejection mechanism includes a spring. The battery abuts one end of the battery compartment through the spring. The locking mechanism includes a rotating shaft, a button, and a bolt. A positioning hole matching the bolt is provided on the surface of the housing of the battery. The rotating shaft is in the middle of the button and the bolt. The button is pressed to turn up the bolt at the other end to release clamping with the positioning hole on the battery.

Furthermore, the locking mechanism further includes a spring. The spring is located at the button for resetting the bolt after pressing is released.

Furthermore, the opening of the battery compartment is downward.

EMBODIMENT 6

This embodiment provides a fascia gun. The fascia gun includes a battery compartment provided on a fascia gun holding portion. A press ejection mechanism is provided in the battery compartment. The press ejection mechanism abuts one end of a battery. A lower end surface of the battery is pressed to trigger the press ejection mechanism to eject the battery.

Furthermore, the press ejection mechanism includes a fixed block provided in the battery compartment, a sliding base, and a moving member. The fixed block is provided with a terminal electrically connected to the battery; the sliding base is slidably connected to the fixed block; the moving member is connected to the sliding base and the fixed block.

Furthermore, the fixed block is provided with a stopper. The moving member works in conjunction with the stopper, such that the battery is received in the battery compartment and ejected out of the battery compartment along with a press cycle.

Furthermore, the sliding base is provided with a bolt. A positioning hole matching the bolt is provided on the surface of the battery housing. Engagement and disengagement between the bolt and the positioning hole are implemented through relative sliding between the sliding base and the fixed block.

Furthermore, a spring is further provided between the sliding base and the fixed block.

Furthermore, the opening of the battery compartment is downward.

EMBODIMENT 7

The present disclosure provides a lithium battery drill. The lithium battery drill includes a battery compartment provided on a lithium battery drill holding portion. A battery ejection mechanism is provided in the battery compartment. The battery ejection mechanism abuts one end of a battery. A locking mechanism for controlling the ejection of the battery is provided at an outlet end of the battery compartment.

Furthermore, the battery ejection mechanism includes a spring. The battery abuts one end of the battery compartment through the spring. The locking mechanism includes a rotating shaft, a button, and a bolt. A positioning hole matching the bolt is provided on the surface of the housing of the battery. The rotating shaft is in the middle of the button and the bolt. The button is pressed to turn up the bolt at the other end to release clamping with the positioning hole on the battery.

Furthermore, the locking mechanism further includes a spring. The spring is located at the button for resetting the bolt after pressing is released.

Furthermore, the opening of the battery compartment is downward.

EMBODIMENT 8

The present disclosure provides a lithium battery drill. The lithium battery drill includes a battery compartment provided on a lithium battery drill holding portion. A press ejection mechanism is provided in the battery compartment. The press ejection mechanism abuts one end of a battery. A lower end surface of the battery is pressed to trigger the press ejection mechanism to eject the battery.

Furthermore, the press ejection mechanism includes a fixed block provided in the battery compartment, a sliding base, and a moving member. The fixed block is provided with a terminal electrically connected to the battery. The sliding base is slidably connected to the fixed block. The moving member is connected to the sliding base and the fixed block.

Furthermore, the fixed block is provided with a stopper. The moving member works in conjunction with the stopper, such that the battery is received in the battery compartment and ejected out of the battery compartment along with a press cycle.

Furthermore, the sliding base is provided with a bolt. A positioning hole matching the bolt is provided on the surface of the battery housing. Engagement and disengagement between the bolt and the positioning hole are implemented through relative sliding between the sliding base and the fixed block.

Furthermore, a spring is further provided between the sliding base and the fixed block.

Furthermore, the opening of the battery compartment is downward.

EMBODIMENT 9

Figure 15:
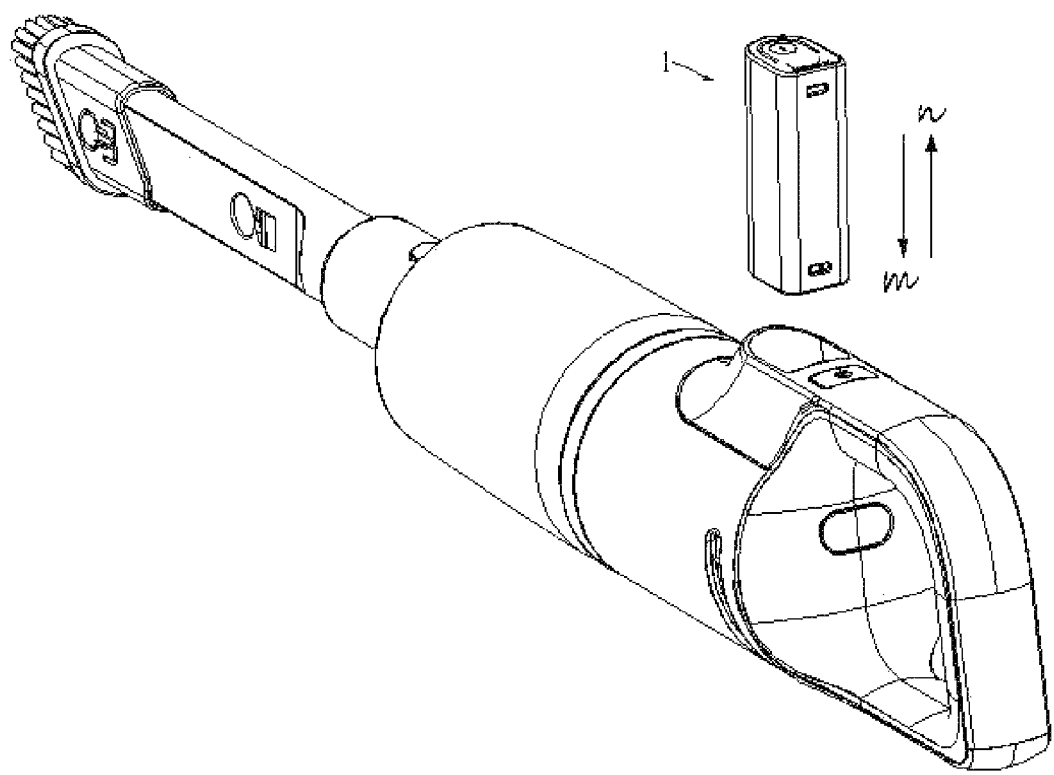
FIG. 15 is a schematic structural diagram of a handheld tool in an exemplary embodiment of the present disclosure.
Figure 16:
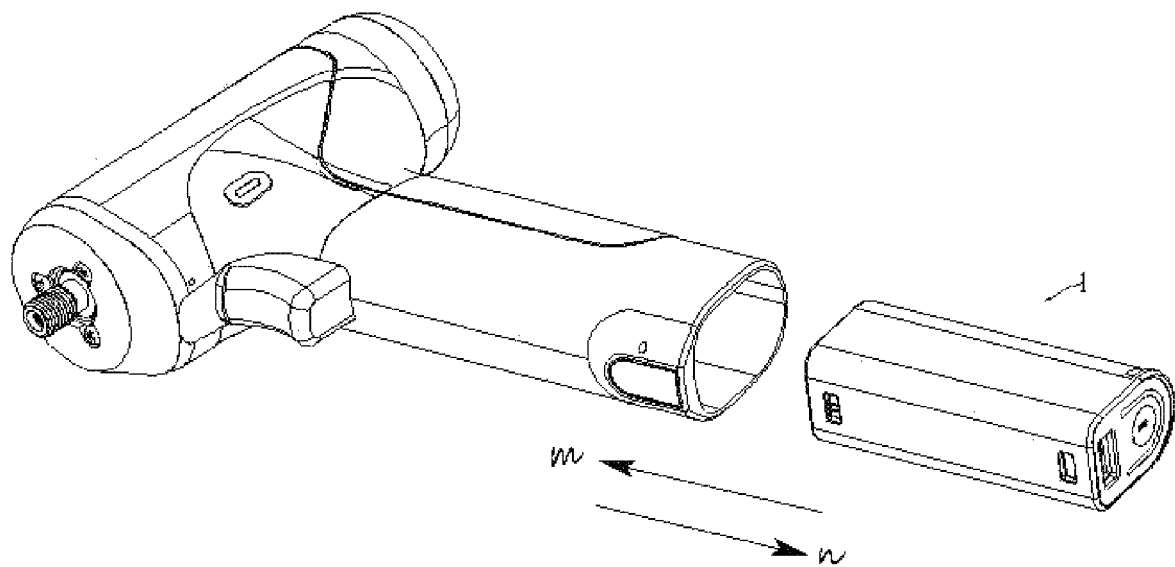
FIG. 16 is a schematic structural diagram of a handheld tool in an exemplary embodiment of the present disclosure.

As shown in FIG. 15, this embodiment provides a vacuum cleaner having battery pack 1. The vacuum cleaner includes a device housing, and the battery pack 1 is fixedly mounted through the device housing. The device housing is provided with a battery pack shaft for accommodating the battery pack 1.

Furthermore, the device housing includes a main housing for accommodating a drive motor, and a handle housing extending along an axis G of the device housing.

Furthermore, the battery pack 1 is provided with a battery pack housing. At least a part of the device housing is composed of a part of the battery pack housing.

A top end surface of the battery pack housing and the housing surface of the device housing are combined to form a complete flat surface or curved surface.

The battery pack shaft is located between the drive motor and the handle housing.

An electric quantity display portion and/or a charge/discharge interface are provided on the top end surface of the battery pack housing.

A z-axis of the battery pack housing in a height direction and a rotation axis of an electric drive motor in the drive motor are located within a same plane V.

The z-axis of the battery pack housing in the height direction intersects with an axis G of the device housing.

The axis G of the device housing, the z-axis of the battery pack housing in the height direction, and the rotation axis of the electric drive motor are located within the same plane V.

There is an included angle α between a vertical line Q of the axis G of the device housing within the plane V and the z axis of the battery pack housing in the height direction, where $-20°<\alpha>20°$.

The charge/discharge interface is a USB interface or a type-C interface.

A vacuum cleaner having battery pack 1 includes a device housing, and the battery pack 1 fixedly mounted through the device housing.

The device housing is provided with a battery pack shaft for accommodating the battery pack 1.

The device housing includes a main housing for accommodating a drive motor, and a handle housing extending along an axis G of the device housing.

The battery pack 1 is provided with a battery pack housing, and the top end surface of the battery pack housing is adjacent to the housing surface of the device housing.

According to the vacuum cleaner having the battery pack provided in this embodiment, the top end surface of the battery pack housing is used as a supplement to the housing surface of the device housing at the battery pack shaft to form a complete plane or curved surface as a whole, such that the structure of the vacuum cleaner is complete, the user experience is improved, and the product is more aesthetically pleasing.

Moreover, the z-axis of the battery pack housing in the height direction is set forward or backward within a certain range, such that when the battery pack housing has a certain inclination angle, it is more convenient for the user to perform an insertion operation of replacing the battery pack. In addition, by arranging the electric quantity display portion and the charge/discharge interface, the battery pack for the power tool has a wider application range and higher practicability.

The terms "lower than", "higher than", "upper bottom surface" and "lower bottom surface" in the present disclosure are all described as examples in the accompanying drawings and do not constitute a limitation to the present disclosure. Any equivalent structure or equivalent flow transformation made by using the specification of the present disclosure or direct or indirect application thereof in other related technical fields shall still fall within the protection scope of the patent of the present disclosure.

What is claimed is:

1. A handheld tool, comprising:
   a tool housing, wherein an accommodating cavity is provided in the tool housing;
   a power system provided in the accommodating cavity, wherein the power system comprises a drive device and a transmission mechanism;
   a battery cavity structure comprising a battery compartment capable of accommodating a battery and allowing the battery to be inserted into and pulled out, an ejection mechanism, and a locking mechanism, wherein the battery compartment is provided with an outlet, the ejection mechanism is mounted at an end opposite to the outlet of the battery compartment, and the locking mechanism is configured to limit the battery disposed in the battery compartment to prevent the battery from coming out from the outlet of the battery compartment; and
   the battery mounted in the battery compartment in a pluggable manner, wherein an end surface of the battery is adjacent to an end surface of the outlet of the battery compartment,
   wherein the locking mechanism is mounted at an outlet end of the battery compartment, and
   wherein the battery comprises a battery housing and a cell provided in the battery housing, a latch is provided at the outlet end of the battery compartment, the battery housing is provided with a latch groove matching the latch, and the latch is movably connected to the latch groove for locking or unlocking the battery.

2. The handheld tool according to claim 1, wherein the battery cavity structure is disposed on a holding portion of the handheld tool.

3. The handheld tool according to claim 1, wherein the end surface of the battery close to the outlet end of the battery compartment and the end surface of the outlet of the battery compartment are basically on a same plane, and the end surface of the battery constitutes a part of a surface of the handheld tool.

4. The handheld tool according to claim 1, wherein the battery housing comprises a basal body and an end cover, and the end cover is disposed at an opening end of the basal body for closing the basal body.

5. The handheld tool according to claim 4, wherein an edge of the end cover of the battery housing is not higher than a side surface of the basal body.

6. The handheld tool according to claim 4, wherein the basal body is of a tubular structure having openings at both ends, the end cover is disposed inside the opening end of the basal body, and a plane of the end cover is not higher than planes of the openings of the basal body.

7. The handheld tool according to claim 4, wherein the basal body is of a cup-shaped structure having an opening at one end, the end cover is disposed inside the opening end of the basal body, and a plane of the end cover is not higher than a plane of the opening of the basal body.

8. A handheld tool, comprising:
   a tool housing, wherein an accommodating cavity is provided in the tool housing;
   a power system provided in the accommodating cavity, wherein the power system comprises a drive device and a transmission mechanism;
   a battery cavity structure comprising a battery compartment capable of accommodating a battery and allowing the battery to be inserted into and pulled out, an ejection mechanism, and a locking mechanism, wherein the battery compartment is provided with an outlet, the ejection mechanism is mounted at an end opposite to the outlet of the battery compartment, and the locking mechanism is configured to limit the battery disposed in the battery compartment to prevent the battery from coming out from the outlet of the battery compartment; and the battery mounted in the battery compartment in a pluggable manner, wherein an end surface of the battery is adjacent to an end surface of the outlet of the battery compartment, wherein the locking mechanism is mounted at the end opposite to the outlet of the battery compartment.

9. The handheld tool according to claim 8, wherein the ejection mechanism is disposed near the locking mechanism, and the ejection mechanism is a press-type ejection mechanism, such that the battery is received in the battery compartment and ejected out of the battery compartment along with a press cycle.

10. A handheld tool, comprising:
a tool housing, wherein an accommodating cavity is provided in the tool housing;
a power system provided in the accommodating cavity, wherein the power system comprises a drive device and a transmission mechanism;
a battery cavity structure comprising a battery compartment capable of accommodating a battery and allowing the battery to be inserted into and pulled out, an ejection mechanism, and a locking mechanism, wherein the battery compartment is provided with an outlet, the ejection mechanism is mounted at an end opposite to the outlet of the battery compartment, and the locking mechanism is configured to limit the battery disposed in the battery compartment to prevent the battery from coming out from the outlet of the battery compartment; and the battery mounted in the battery compartment in a pluggable manner, wherein an end surface of the battery is adjacent to an end surface of the outlet of the battery compartment, wherein the battery comprises a battery housing and a cell provided in the battery housing, the battery housing comprises a basal body and an end cover, and the end cover is disposed at an opening end of the basal body for closing the basal body, and wherein an edge of the end cover of the battery housing is not higher than a side surface of the basal body.

11. The handheld tool according to claim 10, wherein the end surface of the battery close to an outlet end of the battery compartment and the end surface of the outlet of the battery compartment are basically on a same plane, and the end surface of the battery constitutes a part of a surface of the handheld tool.

12. The handheld tool according to claim 10, wherein the basal body is of a tubular structure having openings at both ends, the end cover is disposed inside the opening end of the basal body, and a plane of the end cover is not higher than planes of the openings of the basal body.

13. The handheld tool according to claim 10, wherein the basal body is of a cup-shaped structure having an opening at one end, the end cover is disposed inside the opening end of the basal body, and a plane of the end cover is not higher than a plane of the opening of the basal body.

* * * * *